United States Patent
Forman et al.

(10) Patent No.: US 7,668,789 B1
(45) Date of Patent: Feb. 23, 2010

(54) COMPARING DISTRIBUTIONS OF CASES OVER GROUPS OF CATEGORIES

(75) Inventors: George H. Forman, Port Orchard, WA (US); Henri J. Suermondt, Sunnyvale, CA (US); Evan R. Kirshenbaum, Mountain View, CA (US); Mark D. Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 11/393,487

(22) Filed: Mar. 30, 2006

(51) Int. Cl.
*G06E 3/00* (2006.01)
(52) U.S. Cl. .............................. 706/20; 706/21; 706/15; 706/12
(58) Field of Classification Search .................. 706/20, 706/21, 15, 12, 14, 45
See application file for complete search history.

(56) References Cited

U.S. PATENT DOCUMENTS

| | | | |
|---|---|---|---|
| 5,819,258 A | 10/1998 | Vaithyanathan et al. | |
| 5,903,884 A | 5/1999 | Lyon et al. | |
| 5,943,670 A | 8/1999 | Prager | |
| 6,003,027 A | 12/1999 | Prager | |
| 6,038,560 A | 3/2000 | Wical | |
| 6,418,434 B1 | 7/2002 | Johnson et al. | |
| 6,675,161 B1 | 1/2004 | Suchter | |
| 6,701,333 B2 | 3/2004 | Suermondt et al. | |
| 6,704,905 B2 | 3/2004 | Fukushige et al. | |
| 6,728,690 B1 | 4/2004 | Meek et al. | |
| 6,823,323 B2 | 11/2004 | Forman et al. | |
| 6,842,751 B1 | 1/2005 | Vilalta et al. | |
| 6,925,454 B2 | 8/2005 | Lam et al. | |
| 6,944,616 B2 | 9/2005 | Ferguson et al. | |
| 6,973,452 B2 | 12/2005 | Metzger et al. | |
| 7,043,492 B1 | 5/2006 | Neal et al. | |
| 7,113,957 B1 | 9/2006 | Cohen et al. | |
| 7,177,855 B2 | 2/2007 | Witkowski et al. | |
| 7,184,602 B2 | 2/2007 | Cohen et al. | |
| 7,349,917 B2 | 3/2008 | Forman et al. | |
| 7,406,452 B2 * | 7/2008 | Forman et al. ................. | 706/20 |
| 7,437,338 B1 | 10/2008 | Forman et al. | |
| 7,467,079 B2 * | 12/2008 | Morimoto et al. .............. | 704/9 |
| 2003/0187809 A1 | 10/2003 | Suermondt et al. | |
| 2005/0096866 A1 | 5/2005 | Shan et al. | |
| 2006/0173559 A1 | 8/2006 | Kirshenbaum et al. | |
| 2007/0185901 A1 | 8/2007 | Gates | |

FOREIGN PATENT DOCUMENTS

EP      0747848 A2    12/1996

OTHER PUBLICATIONS

G. Forman, U.S. Appl. No. 10/902,924, entitled "System and Method for Category Discovery," filed Jul. 30, 2004, pp. 1-38, Figs. 1-7D.

(Continued)

*Primary Examiner*—Creighton Smith

(57) ABSTRACT

A first distribution of cases over a first group of categories is received. A categorizer trained using a search-and-confirm technique classifies the cases into a second group of categories. A second distribution of the cases over the second group of categories is generated using results of the classifying. The first and second distributions are compared to identify differences between the first and second distributions.

20 Claims, 7 Drawing Sheets

OTHER PUBLICATIONS

Forman et al., U.S. Appl. No. 11/080,098, entitled "A Method of, and System for, Classification Count Adjustment," filed Mar. 14, 2005, pp. 1-31, Figs. 1A-5.

Kirshenbaum et al., U.S. Appl. No. 11/118,178, entitled "Providing Training Information for Training a Categorizer," filed Apr. 29, 2005, pp. 1-39, Figs. 1-3E.

Kirshenbaum et al., U.S. Appl. No. 11/118,786, entitled "Computing a Quantification Measure Associated with Cases in a Category," filed Apr. 29, 2005, pp. 1-35, Figs. 1-3D.

Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.

Kirshenbaum et al., U.S. Appl. No. 11/211,979, entitled "Producing a Measure Regarding Cases Associated with an Issue After One or More Events Have Occured," filed Aug. 25, 2005, pp. 1-51, Figs. 1-5H.

Forman et al., U.S. Appl. No. 11/364,108, entitled "Identifying an Emerging or New Category," filed Feb. 28, 2006, pp. 1-34, Figs. 1-6.

Shan, U.S. Appl. No. 11/117,989, entitled "Performing Quality Determination of Data," filed Apr. 29, 2005, pp. 1-32, Figs. 1-9.

Shan, U.S. Appl. No. 11/118,832, entitled "Determining a Time Point Corresponding to a Change in Data Values Based on Fitting with Respect to Plural Aggregate Value Sets," filed Apr. 29, 2008, pp. 1-26, Figs. 1-8.

Shan, U.S. Appl. No. 11/119,037, entitled "Detecting Change in Data," filed Apr. 29, 2005, pp. 1-26, Figs. 1-6.

Office Action dated Jun. 2, 2008 in U.S. Appl. No. 11/118,178.

Office Action dated Oct. 16, 2007 in U.S. Appl. No. 11/118,178.

Office Action dated Sep. 18, 2007 in U.S. Appl. No. 11/118,786.

Office Action dated Jan. 17, 2008 in U.S. Appl. No. 11/386,005, now U.S. Patent No. 7,437,338.

Final Rejection dated Apr. 18, 2008 in U.S. Appl. No. 11/118,786.

* cited by examiner

COMPARING DISTRIBUTIONS OF CASES OVER GROUPS OF CATEGORIES

BACKGROUND

An organization (such as a business organization, educational organization, or government organization) involved in providing services or products to customers or other users usually experience various customer support issues. For example, whenever a new product is introduced into a market, some users will encounter difficulties due to actual defects of the product or due to users being unable to figure out how to properly use the product. There are numerous other examples of problems that can be encountered with respect to products or services provided by an organization.

In the customer service call center context, customer support representatives (or call agents) are asked to choose categories, from a set of predefined categories (referred to as "issue paths"), to associate with a customer call at the time that the call occurs. Typically, the customer support representative is asked to label each case from a selection of menu choices (that correspond to the issue paths).

The issue paths available to the customer support representatives may either be inaccurate or incomplete, which may lead to improper categorizations of calls received by the customer support representatives. Also, customer support representatives themselves may be improperly trained or incented to make the right choices with respect to which issue paths should be selected for received calls.

BRIEF DESCRIPTION OF THE DRAWINGS

Some embodiments of the invention are described with respect to the following figures.

DETAILED DESCRIPTION

Figure 1:
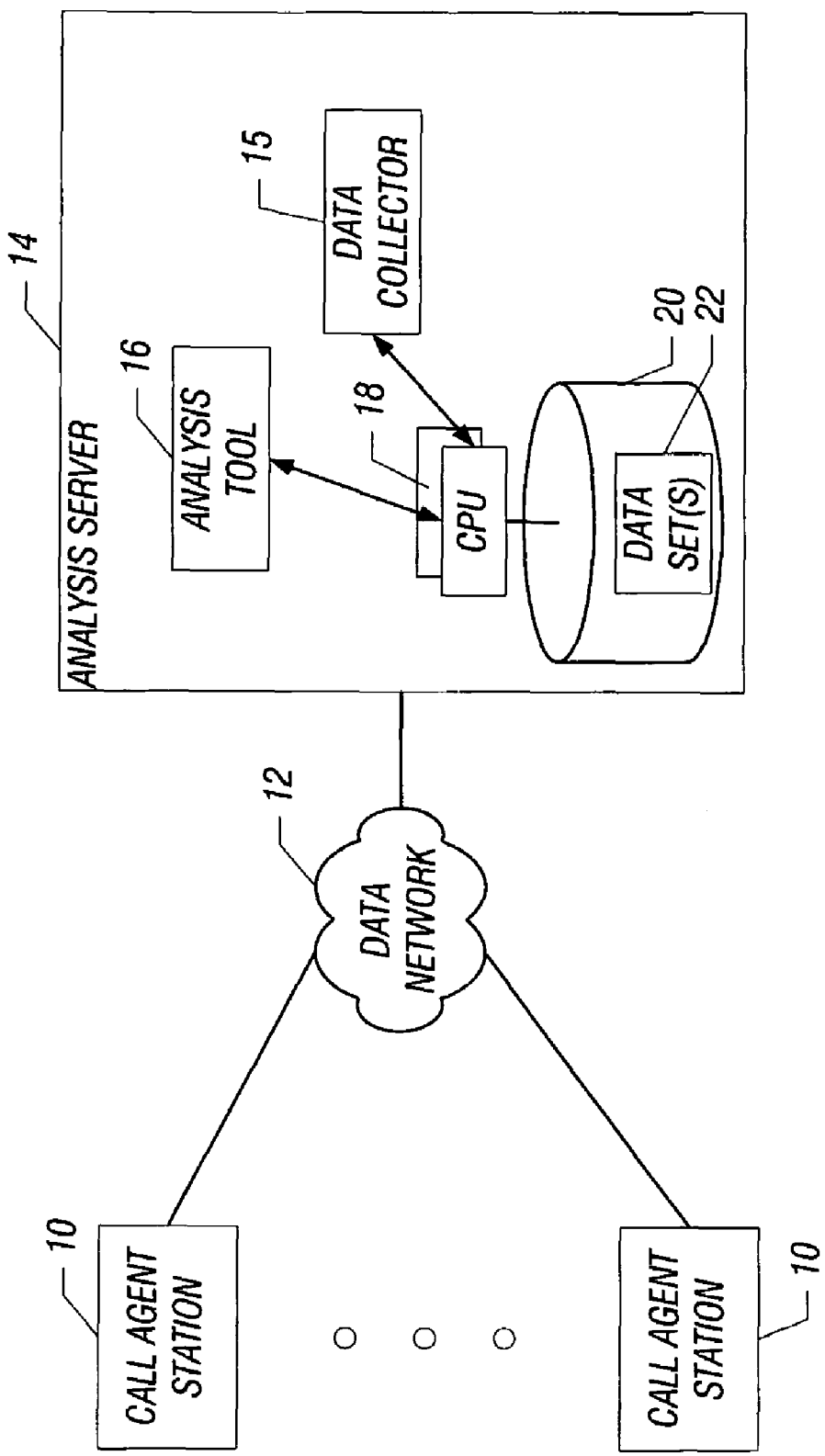
FIG. 1 is a block diagram of a network that includes call agent stations coupled to an analysis server, according to an embodiment.

FIG. 1 illustrates nodes coupled to a data network 12, where the nodes include call agent stations 10 and an analysis server 14. In the example of FIG. 1, the call agent stations 10 are associated with call agents (such as customer support personnel) in a customer support organization. The call agent stations 10 communicate over the data network 12 with the analysis server 14. As call agents receive calls from customers, information pertaining to the calls is entered by the call agents into the call agent stations 10. A call may be received by a call agent by using a telephone, electronic mail, physical mail, facsimile, newsgroup posting, on-line chat, face-to-face conversation, survey response, form response, and so forth. The entered information is communicated over the data network 12 to the analysis server 14, where a data collector 15 stores the information in one or more data sets 22. In other implementations, the analysis server 14 can be used in other contexts aside from a customer support context. Also, the call agent stations 10 can be omitted in other implementations.

Alternatively, the call agent stations 10 can be replaced with self-help servers, such as self-help servers that provide web pages accessible by customers seeking help with respect to various issues. The self-help servers are able to prompt such customers to enter information regarding the issue(s) they are facing. The information is collected and communicated to the analysis server 14 for storing in the one or more data sets 22.

The one or more data sets 22 are stored in a storage 20. The storage 20 can be persistent storage (such as magnetic or optical disk drives or non-volatile semiconductor memory devices), volatile memory (such as dynamic random access memories or static random access memories), or other types of storage devices. The storage 20 is connected to one or plural central processing units (CPUs) 18 in the analysis server 14. Alternatively, the one or more data sets 22 are stored on a database system separate from the analysis server 14.

The data collector 15 is executable on the one or plural CPU(s) 18. Also, as depicted in FIG. 1, the analysis server 14 includes an analysis tool 16 that is also executable on the CPU(s) 18. The analysis tool 16 performs analysis of the information contained in the data set(s) 22 stored in the storage 20. The information in the data set(s) 22 is collected as individual cases associated with calls received by call agents at call agent stations 10, received from self-help servers, or received from other data sources.

A "case" refers to a data item that represents a thing, event, or some other item. Each case is associated with predefined information (e.g., product description, summary of problem, time of event, and so forth). In the customer support context, a "case" represents an instance of an interaction between a customer (e.g., a user, patron, subscriber, visitor, member, employee, participant, constituent, supplier, partner, etc.) and an organization (e.g., company, manufacturer, store, provider, employer, representative, etc.) that is indicative of one or more of the following: a remedial action should be taken; information is requested; the customer has expressed confusion; and the customer has expressed satisfaction or dissatisfaction with something at least partially under control of the entity or another party the entity represents.

In the customer support context, a "category" (e.g., problem, issue, concern, etc.) represents an underlying reason for an interaction that is the subject of a case (such as satisfaction or dissatisfaction that led to the case). Such categories can reflect problems associated with a product or service (e.g., defects in product design or manufacture, hardware problems, software problems, hard disk problems, battery problems, and so forth), difficulties in understanding how to correctly use a product or service, difficulty obtaining a product or service, difficulty obtaining information about a product or service, concerns about the value of a product or service, desires for features lacking in a product or service, poor experience interacting with the entity, and so forth. Other entity/customer relationships (e.g., employer/employee, government/constituent) will have similar sets of categories reflecting the types of concerns the customers have and the types of control the entities have. In other environments, other types of categories are employed.

Although described in the context of a customer support environment that includes call agents receiving calls at call agent stations, other embodiments of the invention are applicable to other types of systems for other types of organizations (e.g., educational organizations, government organizations, business organizations, financial organizations, and so forth). For example, in the data storage context, a "case" can refer to a document (or a part of a document), such as an e-mail message, a slide, a text document, and so forth. A "category" can refer to the metadata associated with the document. Such metadata can be attached manually or automatically (such as by using categorizers or rules). Thus, a collection of documents can be associated with respective metadata (corresponding to categories).

In the customer support context, as call agents receive calls from customers, call agents can perform categorizations of cases (in the form of calls) to one or more categories (also referred to as issue paths). The categories (or issue paths) that the call agents work with constitute a first group of categories. When a call agent receives a call, a call agent can select one or more of the first group of categories to which the particular call can be assigned. This can be done in a number of different ways. The first group of categories can be in the form of menu selections provided in the graphical user interface (CPU) of a call agent station 10 at which the call agent is located. Alternatively, the first group of categories can be provided in some written list that is accessible by the call agent. The identification of the category or categories selected may be made by directly selecting one or more items from a list, such as by using a mouse or keyboard-controlled cursor or by typing in names, numbers, or other codes indicative of the category or categories.

In the self-help context, instead of the call agent classifying a case among the first group of categories, a customer instead can perform the categorization. For example, the web page that the customer is accessing can present a list of options (corresponding to the first group of categories) that are selectable by the customer to make the desired categorization.

In either case, the categorizations performed by the call agents or by customers can be inaccurate for various reasons. As used here, call agents or customers are more generally referred to as "users." "Users" can also refer to other personnel. One reason for inaccuracies of user categorizations is that the first group of categories may be inaccurate or incomplete. Inaccurate categories refer to categories that do not actually represent any issue that an organization is concerned with. An incomplete group of categories refers to a group of categories that is missing one or more categories that should be there to represent issues that an organization is concerned with. Inaccurate or incomplete categories will often lead to inaccurate or unreliable categorizations performed by users.

Another source of unreliability is that users (e.g., call agents or customers) may not have sufficient knowledge (e.g., due to improper training, insufficient understanding of the categories, and so forth) to properly assign cases to the proper categories. A further source of unreliability is that users are not incented to do a good job picking the correct categories. Call agents may be rewarded primarily for finishing calls quickly and customers have little incentive to spend time giving feedback. Often, either because of lack of knowledge or in order to save time, a user may pick categories near the top of the list or categories that the user is most familiar with or more readily recognizes. A user may pick a more general category rather than a more specific category, or an uninformative category (such as, for example, "miscellaneous") when information is available that would allow the selection of a different category.

The above describes inaccurate categorizations performed by humans, such as call agents or customers. Another form of inaccurate categorization is categorization performed by a classifier (also referred to as a categorizer), which is often a software tool that is trained to receive an input set of cases and to assign the cases to various categories. An improperly trained categorizer will often incorrectly assign cases to categories.

As also noted above, categories (in the form of metadata) can also be associated with documents (such as in the storage context). The metadata associated (manually or automatically) with the documents may also be inaccurate.

The categorizations induce a distribution of cases over the categories. The distribution is an indication of the size of each category relative to other categories. In one embodiment, a distribution includes a set of categories and a set of zero or more cases assigned to each of the categories. In another embodiment, a distribution is a set of categories and a set of count estimates of the number of cases in each of the categories. In yet another embodiment, a distribution is a set of categories and a set of proportions (such as percentages, probabilities, etc) indicating the relative sizes of each of the categories.

In accordance with some embodiments, the analysis tool 16 is able to validate initial categorizations (or even guesses or estimations) performed by humans or by categorizers regarding classifications of an input set of cases into various categories. The initial categorizations, guesses, or estimates performed by humans or categorizers can more generally be referred to as "initial assignments." Validating the initial assignments refers to checking or assessing the correctness of the initial assignments or identifying discrepancies that exist between the initial assignments and subsequent categorizations.

Figure 2:
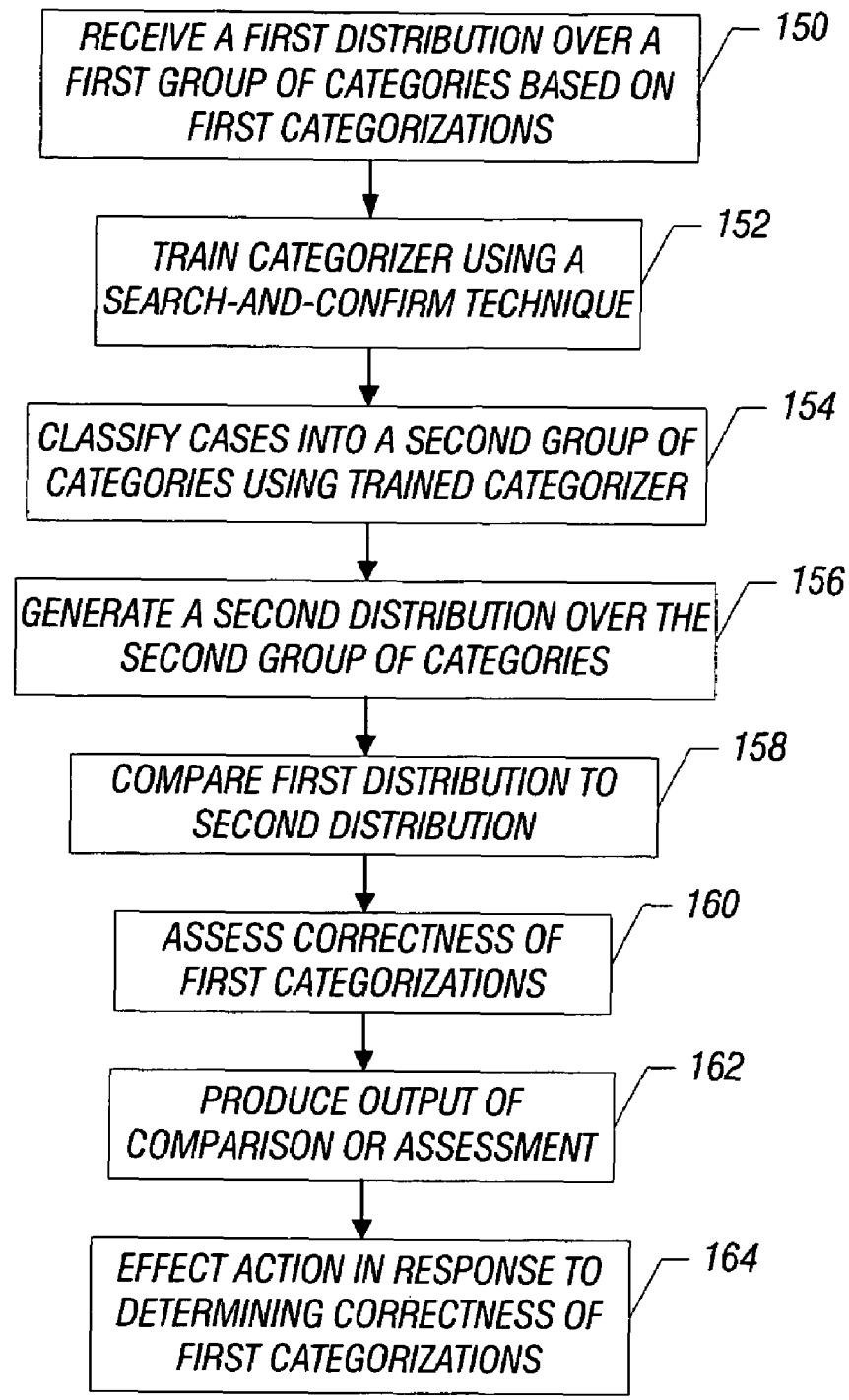
FIG. 2 is a flow diagram of a process for validating correctness of categorizations, according to an embodiment.

Generally, as shown in FIG. 2, the analysis tool 16 receives (at 150) a first distribution over a first group of categories, where the first distribution is developed based on initial (or first) categorizations, such as the categorizations performed by users or categorizers. Alternatively, the first distribution can be based on guesses or estimations (not actually categorization or classification) performed by a human or by software. Such a first distribution reflects any one or more of the following: a set of categories and assignment of cases in the categories; and a set of categories and a number or proportion of cases associated with the categories. Thus, reference to a distribution of cases over categories refers to either a distribution that assigns/groups the cases into the categories, or a distribution that assigns measures (e.g., counts, proportions, etc.) to the categories to represent the numbers, percentages, etc., of the cases in respective categories.

To validate the first distribution, a categorizer is trained (at 152) using a search-and-confirm technique. Assuming that the first categorizations are performed by a categorizer, the categorizer trained at 152 can be the same categorizer (prior to training according to the search-and-confirm technique) or a different categorizer. In either case, the trained categorizer is considered different from the categorizer that performed the first categorizations. The search-and-confirm technique refers generally to a technique for developing training cases for the purpose of training a categorizer. Search-and-confirm involves submitting a query to retrieve cases that match one or more criteria specified in the query, followed by a user performing either confirmation or disconfirmation of whether a particular case belongs or does not belong to one or more categories.

The trained categorizer is then used to classify (at 154) the cases (usually the cases associated with the first distribution but can also be other cases) into a second group of categories, where the second group of categories can be identical to or different from the first group of categories. Based on the classification performed by the trained categorizer, a second distribution over the second group of categories is generated (at 156). The second distribution may be based directly on the classification performed by the trained categorizer, or it may additionally be adjusted based on known measures of behavior (such as true positive rate, false positive rate, and other measures) of the trained categorizer (calibration of quantifiers described further below). The first distribution is then compared to the second distribution (at 158). Based on the comparison, the correctness of the first categorizations is assessed (at 160). More generally, instead of assessing correctness of the first categorizations, discrepancies (differences) between the first distribution and the second distribution are identified, where such discrepancies can be used to assess accuracy of the first categorizations or other types of initial assignments (such as guesses or estimations).

Next, an output relating to either the comparing task (158) or the assessment task (160), or both, is generated (at 162). The output can be in the form of a report, graph, chart, and so forth, to provide a user some feedback regarding any one or more of: (1) accuracy of the first categorizations; (2) discrepancies between the first and second distributions; and so forth.

A remedial action can also be effected or identified (at 164) in response to assessing correctness of the first categorizations. The effected or identified action includes modifying the first group of categories, training users with respect to the first group of categories, developing documentation to assist users in assigning cases to the first group of categories, changing incentives given to users, correcting a measure estimated for a category in the first group, changing a workflow, updating a report, and other actions.

In addition to the tasks indicated in FIG. 2, the analysis tool 16 can also be interactively used by a user to identify new categories relevant for the cases contained in the data set(s) 22. The analysis tool 16 also enables the creation of training cases, based on user input (described further below), from the cases for the purpose of training a categorizer or plural categorizers in the analysis tool 16.

Figure 3:
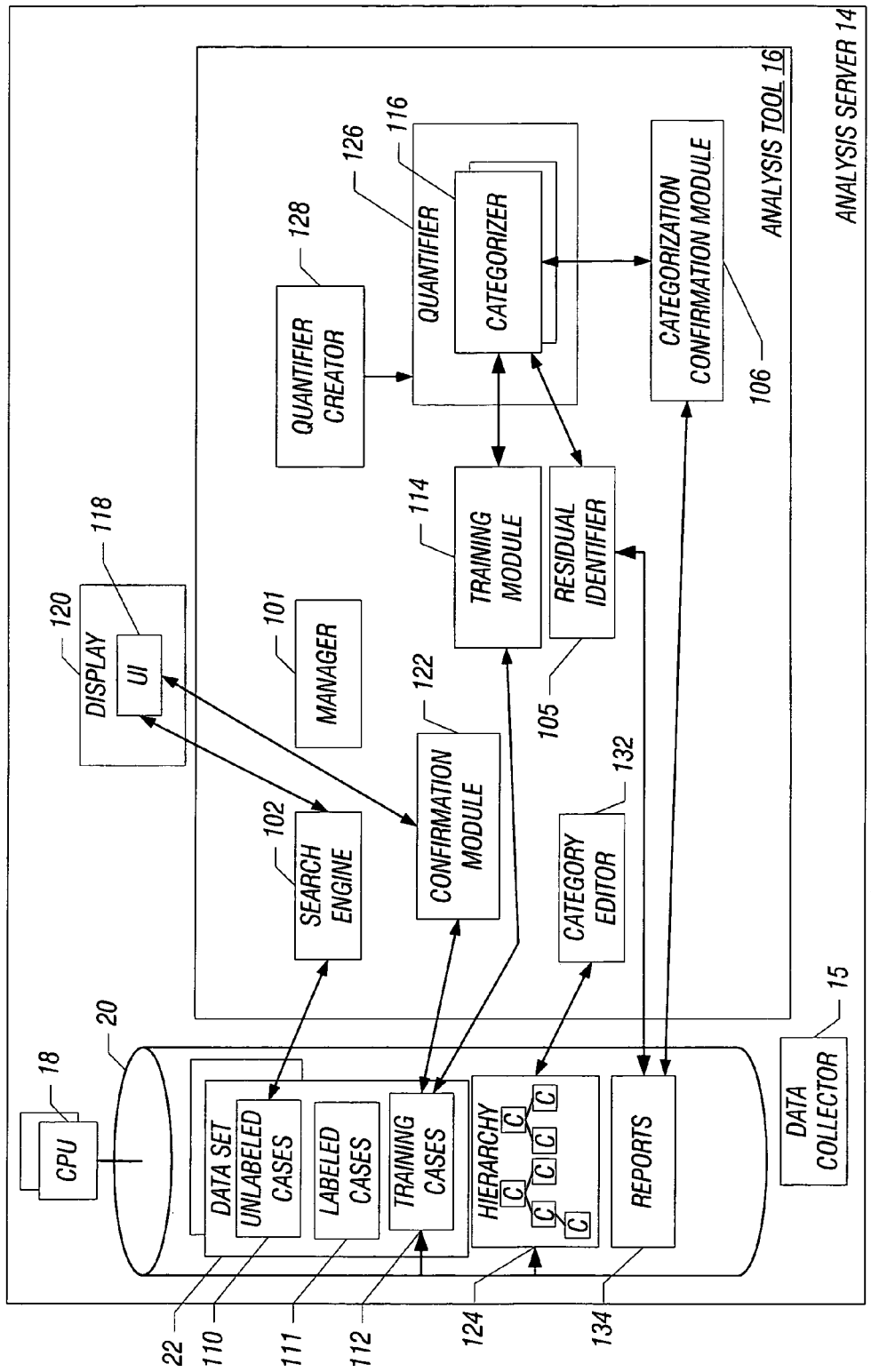
FIG. 3 is a block diagram of a computer that incorporates a tool according to an embodiment of the invention.

FIG. 3 shows the modules in the analysis tool 16 as well as the content of storage 20, in accordance with an example embodiment, in greater detail. The analysis tool 16 contains various modules according to some embodiments that are executable on the CPU(s) 18. The modules include one or more categorizers 116 for classifying cases (unlabeled cases 110 and labeled cases 111 in the data set 22) with respect to one or more categories (represented as a hierarchy 124 of categories in one implementation or as some other form of collection of one or more categories in another implementation). Unlabeled cases 110 are cases that are not initially identified with any particular category or categories. Labeled case 111 are cases that have been labeled as belonging to a category or plural categories.

In one embodiment, the categories in the hierarchy 124 of categories are in a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In alternative implementations, other structural relationships of categories can be employed.

The following is an example hierarchy:
    problem
      hardware
        battery
        screen
          cracked
          bad-color
      software
        e-mail
    product In the example above, the "problem" and "product" categories are considered top-level categories. The "hardware" and "software" categories are children of the "problem" category, with the "hardware" and "software" categories also having their children categories. The "product" top-level category also has children categories (not shown). In the example hierarchy depicted above, the subtree of categories including the "problem" category and its children, grandchildren, and so forth, can be considered as one sub-hierarchy, and the subtree of categories including the "product" category and its children, grandchildren, and so forth, can be considered another sub-hierarchy. Alternatively, the "problem" and "product" trees can be considered separate hierarchies.

The analysis tool 16 provides an efficient and relatively easy-to-use mechanism for identifying categories that may be of interest and for developing training information (in the form of training cases 112, which can include positive training sets of cases and negative training sets of cases) for training the categorizer(s) 116 by a training module 114. Once categories have been identified, the analysis tool 16 also includes a quantifier 126 for performing quantification of cases with respect to one or plural categories present in the hierarchy 124 of categories. "Quantification" refers to the computation of one or more of the following measures: (1) a quantity of cases in each category; and (2) an aggregate (e.g., sum, average, maximum, minimum, etc.) of a data field associated with each of the cases in the respective categories.

The trained categorizer(s) 116 is (are) able to classify cases, including newly received cases from the call agents, into one or more categories reflected in the hierarchy 124 of categories.

As noted above, the categorizer(s) 116 is (are) trained by a training module 114 based on training cases 112 (including positive training sets of cases and negative training sets of cases). In some embodiments, the training of the categorizer(s) 116 is based on a search-and-confirm mechanism that provides a search-and-confirm technique (task 152 in FIG. 2). Training a categorizer refers to building or modifying a categorizer based on the training cases, including a positive training set of cases and a negative training set of cases for each category. Generally, a search-and-confirm technique for training a categorizer involves submitting a search to identify cases that match some criterion or criteria, which allows a user to confirm or disconfirm whether the identified cases belong to a category (or categories). The confirmation/disconfirmation is used to develop training cases that are then used to train the categorizer.

The trained categorizer 116 is then used to categorize cases of the data set(s) 22 into one or more categories. In alternative implementations, multiple trained categorizers 116 can be used to categorize cases of the data set(s) 22 into one or more categories. As the categorizer 116 categorizes cases, quantification of the cases in each category is optionally performed by the quantifier 126.

The analysis tool 16 also includes a categorization confirmation module 106 that assesses correctness or otherwise identifies discrepancies of first categorizations (such as first categorizations performed by call agents according to predetermined issue paths, categorizations performed by customers, or categorizations performed by another categorizer not trained using the search-and-confirm technique). The categorization confirmation module 106 interacts with the categorizer(s) 116 that has(have) been trained using the search-andconfirm technique. The categorization confirmation module 106 performs the comparison and assessment tasks (158 and 160) of FIG. 2.

Output generated by the categorization confirmation module 106 (such as output from task 162 of FIG. 2) is provided as reports 134, which reports can be in graphical form, text form, or any other form.

Although the various modules depicted in FIG. 3 are depicted as being part of one analysis tool 16, it is contemplated that, in other implementations, the modules can be implemented in multiple tools that are deployable in the analysis server 14 or even on other systems. Moreover, in some cases, the categorizer(s) 116, quantifier 126, and/or categorization confirmation module 106 can be provided as an output of the analysis tool 16 for use on other data sets or for use on other systems. By being able to re-run the quantifier 126, categorizer(s) 116, and/or categorization confirmation module 106 on other data sets, the categorization confirmation analysis can be easily repeated daily, weekly, monthly, annually, and so forth. Note that although the categorizer(s) 116, quantifier 126, and/or categorization confirmation module 106 are depicted as separate modules, the modules can be integrated into a single module in other implementations. Also, note that some of the modules in the analysis tool 16 can be omitted in other embodiments.

The search-and-confirm mechanism for developing training cases includes a search engine 102 and confirmation module 122. The search engine 102 enables a user to submit a query and to display a list of cases matching the search criterion or criteria in the query. A case is said to "match" a query if any information associated with the case satisfies some criterion, such as search term, in the query. A "term" or "pattern" specified by a query refers to any string, substring, regular expression, glob expression, non-textual object (e.g., audio object, video object, etc.), or any other term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. With the confirmation module 122, the user is able to confirm or disconfirm whether each of the displayed cases belongs to a category (or plural categories).

The search engine 102 is able to receive a query from a user through a user interface (UI) 118 (presented in a display monitor 120), and to issue the query to identify cases from the data set(s) 22. The search engine 102 displays information regarding identified cases from among the unlabeled cases 110 that match the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the unlabeled cases 110 that match search criterion(ia) (in the form of search terms or patterns) in the query. The user interface 118 displays a summary of each of the matching cases to provide a user with information regarding each case. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. Not all displayed cases need to be confirmed or disconfirmed. For cases that have been correctly matched to a category, such cases are added to a positive training set of cases. On the other hand, for cases that have been incorrectly matched, the confirmation module 122 adds such incorrectly matched cases to a negative training set of cases. The positive and negative training sets, which are part of the training cases 112 stored in the data set 22, are accessed by the training module 114 for training the categorizer 116.

The search engine 102 and confirmation module 122 thus cooperate to develop training cases 112 from cases in the data set 22 (based on user confirmation and disconfirmation), which training cases 112 are used by the training module 114 to train the categorizer 116.

During the searching and confirming, a user can determine that additional categories should be added to a hierarchy 124 of categories, or existing categories in the hierarchy 124 modified. Using a category editor 132 in the analysis tool 16, the user can move, add, modify, or even delete categories (represented by the hierarchy 124 of categories stored in a storage 20). In the example hierarchy 124 depicted in FIG. 2, each box designated "C" represents a category. As depicted, a category can have subcategories, which also can have subcategories. As categories are added, deleted, or modified, additional training cases can be developed for each category, with the training module 114 training the categorizer 116 based on these additional training cases. Adding, deleting, or modifying categories (or subcategories) causes the positive and negative training sets of the training cases 112 to be modified.

The category editor 132 is responsive to user input at the user interface 118 to add categories (or subcategories), delete categories (or subcategories), or modify categories (or subcategories). In response to user input to add, delete, or modify categories (or subcategories), the category editor 132 is able to modify the hierarchy 124 of categories.

A manager module 101 in the analysis tool 16 performs overall management operations, such as managing the storing of data (including training cases 112 and hierarchy 124 of categories) in the storage 20 and coordination among the various modules of the analysis tool 16.

In assessing correctness or otherwise identifying discrepancies of a first distribution of cases over a first group of categories, as performed in FIG. 2, two general approaches can be used. In the first approach, the first distribution of cases (referred to as D) is over a first group of categories (such as issue paths provided to call agents or customers). In this first approach, the second group of categories to be processed by the trained categorizer (trained according to the search-and-confirm technique) is identical to the first group of categories. The trained categorizer generates the second distribution of cases over the second group of categories that is identical to the first group of categories. The second distribution of cases is referred to as distribution G, which is considered a "gold standard" distribution (the distribution that is considered to be the more accurate distribution when compared to distribution D since distribution G was generated by a categorizer trained according to the search-and-confirm technique). Thus, in this first approach, the categorizer trained according to the search-and-confirm technique classifies cases into the same group of categories as was performed previously (such as by call agents, customers, or another categorizer).

With the first approach, the comparison performed at 158 (FIG. 2) by the categorization confirmation module 106 can use any number of techniques, including confusion matrices, chi-squared, cross-entropy, mutual information, or information gain. There are two general types of comparisons, where a first type compares classification of each particular case (in other words, the particular case was classified in one category where the case should have been classified in another category). Techniques for this first type of comparison include confusion matrices, chi-squared, and mutual information. Another type of comparison is a quantification-based comparison, which looks at the overall quantification of cases into particular categories. For example, the initial or first categorizations (performed by the call agent, customer, or other categorizer) may have classified 12% of cases into a first category, but the categorizer trained with the search-and-confirm technique may have led to a quantification estimate of only 7% of cases in the same category. Consequently, there is a discrepancy between the first distribution (that is based on the first categorizations) and the second distribution (that is based on the subsequent categorizations performed by the trained categorizer). Example techniques for making quantification-based comparisons include chi-squared, cross-entropy, and information gain techniques.

Various outputs can be produced by the categorization confirmation module 106, including, as examples, a summary metric (such as a summary metric produced by cross-entropy), side-by-side report (such as a report comparing the percentage of cases categorized into a first category using the first or initial categorizations, and the percentage of cases classified into the same category by the trained categorizer); and identification of the categories with the most notable discrepancy (e.g., biggest percentage difference or highest impact different by some predetermined metric). A cross-entropy report, for example, will compare each first group category with a corresponding second group category and report a number for each pair, where a low cross-entropy number indicates a good comparison (indicating that the first and second distributions closely match) while a high cross-entropy number indicates a poor comparison (indicating that the first and second distributions do not match well). In identifying categories with the most notable discrepancies, the categorization confirmation module 106 provides reports of one or more categories for which the first distribution overestimated or under-estimated corresponding numbers of cases.

In the second approach of assessing correctness or otherwise identifying discrepancies of a first distribution of cases over a first group of categories, the second group of categories used by the trained categorizer (trained according to the search-and-confirm technique) is different from the first group of categories. This second approach can be used if there is lack of confidence in the first group of categories (such as in the issue path hierarchy used by call agents or customers). In one embodiment, the second group of categories can be developed using the first group of categories as a starting point. For example, the search-and-confirm technique can be employed to determine whether additional categories should be added to the first group of categories, and/or whether any category of the first group of categories should be replaced with a different category. The second group of categories is thus considered the "real" group of categories, since the second group of categories is considered to be more accurate than the first group of categories.

In performing the comparison at 158 of FIG. 2 when using the second approach, the categorization confirmation module 106 in some embodiments can perform mutual scatter analysis. In performing the mutual scatter analysis, for a given first group category (such as a given issue path), a report is generated that breaks down the first group category across multiple second group categories (in other words, cases from the first group category is scattered across second group categories). Similarly, for a given second group category, a report is generated that scatters the cases in the second group category across multiple first group categories.

Figure 4:
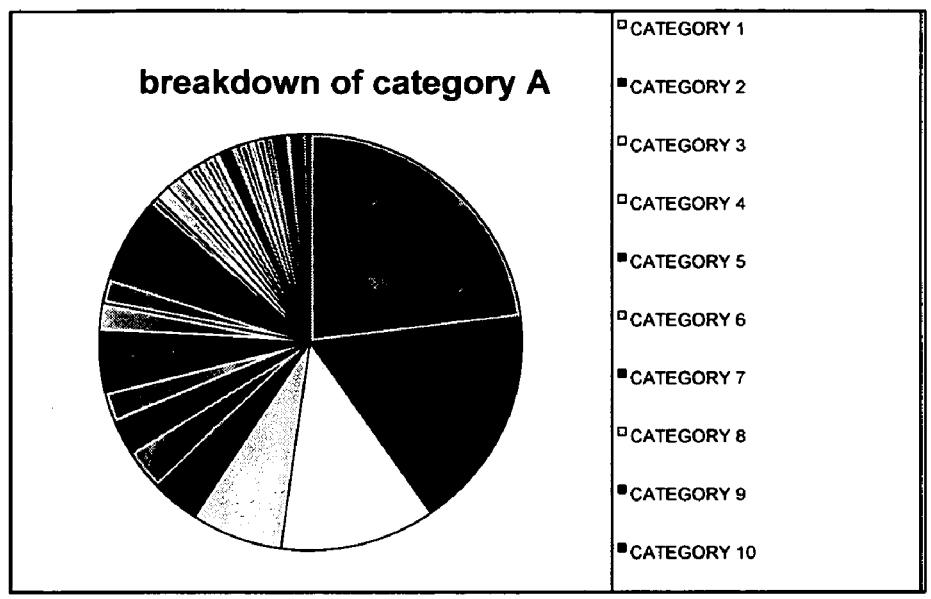
FIGS. 4 and 5 are pie charts illustrating scattering analysis between first and second distributions of cases over respective first and second groups of categories, in accordance with an embodiment.

In the example of FIG. 4, category A is considered to be a first group category, whereas categories 1-10 are considered second group categories. As depicted in FIG. 4, cases that were classified in category A by the first categorization, have been classified into numerous categories in the second group (as indicated by the pie chart of FIG. 4). The pie chart of FIG. 4 thus shows the scatter of cases across the second group categories (categories 1-4).

Figure 5:
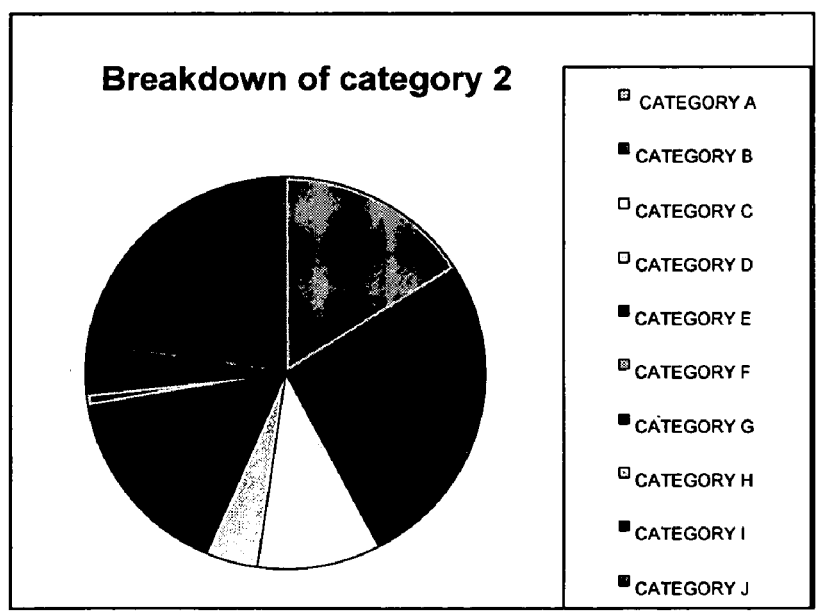

Similarly, FIG. 5 shows the breakdown of cases classified by the trained categorizer (trained according to the search-and-confirm technique) into category 2 (a second group category) across first group categories (categories A-J).

Other types of mutual scatter analysis reports can be generated, such as in table format (where rows represent first group categories and columns represent second group categories, or vice versa). Each entry of the table (an example shown below) represents a percentage of cases classified into a category in one of the first and second groups that is assigned to a category in the other of the first and second groups.

|   | 1 | 2 | 3 | 4 | ... |
|---|---|---|---|---|---|
| A | 20% | 15% | 4% | 12% | ... |
| B |   |   |   |   |   |
| C |   |   |   |   |   |
| . |   |   |   |   |   |
| . |   |   |   |   |   |
| . |   |   |   |   |   |

For example, in the table above, for cases classified by first categorizations into a first group category A, the trained categorizer classified 20% of those cases into second group category 1, 15% of those cases into second group category 2, 4% of those cases into second group category 3, and 12% of those cases into second group category 4. The remaining entries of the table provide similar indications. Alternatively, the table could focus on columns, with the numbers representing the proportion of cases categorized in the column category that were classified by first categorizations into each of the row categories.

Another possible report format for mutual scatter analysis is in graph form, where a first axis represents first group categories and a second axis represents second group categories. Points in the coordinate system represented by the first and second group categories represent scatter of first group categories with respect to second group categories, and vice versa. In such a graph, the values at each point may be indicated by a third orthogonal axis, by color, by shade, by size, by shape, or by any other indicator.

In the output produced by the categorization confirmation module 106 (FIG. 3) in step 162 of FIG. 2 when using the second approach, a scatter metric, such as an information gain metric, can be generated to indicate which first group categories are relatively robust (there is a relatively good mapping from the first group categories to the second group categories, indicated by low scatter) and which first group categories are messy or inaccurate (first group categories that do not map well to the second group categories, indicated by high scatter). Alternatively or additionally, such a metric may be used to indicate which second group categories are well-handled by first group categories and which are not.

Also, with this second approach, first group categories that are not represented in second group categories are also reported (to identify first group categories that are being used with the first categorizations when such categories should not have been used). Identification of such categories can be based on the category names, or alternatively based on determining whether there is poor correlation (e.g., based on a scatter metric) between a first group category and any of the second group categories. For example, a first group category can be identified as not being part of the second group of categories if the scatter metric computed to correlate the first group category to the second group categories is below some threshold value or above some threshold value (depending on the type of scatter metric used, since some scatter metrics have low values to indicate poor correlation while other scatter metrics have high values to indicate poor correlation). Also, categories that are represented in second group categories but are not represented in the first group categories are also reported (the second group categories are new categories that should have been represented in the first group categories).

In embodiments where the first and second groups of categories are hierarchies of categories, a report can also be provided of sub-categories in the second group that are not included in the first group. This allows highlighting of the finer detail (in the form of sub-categories) contained in the second group of categories (developed through interactive use of the analysis tool 16) that is not contained in the first group of categories.

With either of the first and second approaches, once an output (or outputs) is (are) provided regarding the comparison or assessment performed at 158 and 160, respectively, in FIG. 2, an action is effected (164 in FIG. 2). As noted, the effected action includes modifying the first group of categories, training users with respect to the first group of categories, developing documentation to assist users in assigning cases to the first group of categories, changing incentives given to users, correcting a measure estimated for a category in the first group, changing a workflow, and updating a report, and other actions. Other actions that can be effected include rewarding personnel (such as call center representatives) for performing accurate categorizations.

Another example action includes focusing on cases that were not assigned by the trained categorizer with high confidence. In classifying cases, the trained categorizer produces a score to indicate a confidence level. A poor score indicates that the case has not been assigned with high confidence, which may merit additional study to determine whether new categories should be developed.

The analysis tool 16 can also be used to identify one or more example cases that were assigned to a first group category in the first distribution but were not assigned to a corresponding second group category in the second distribution, or vice versa. For example, the first group category can be a "battery" category, and the corresponding second group category can also be a "battery" category or other similar related category. By examining the one or more example cases, a user can determine reasons for the improper assignment of cases in the first distribution.

Figure 6:
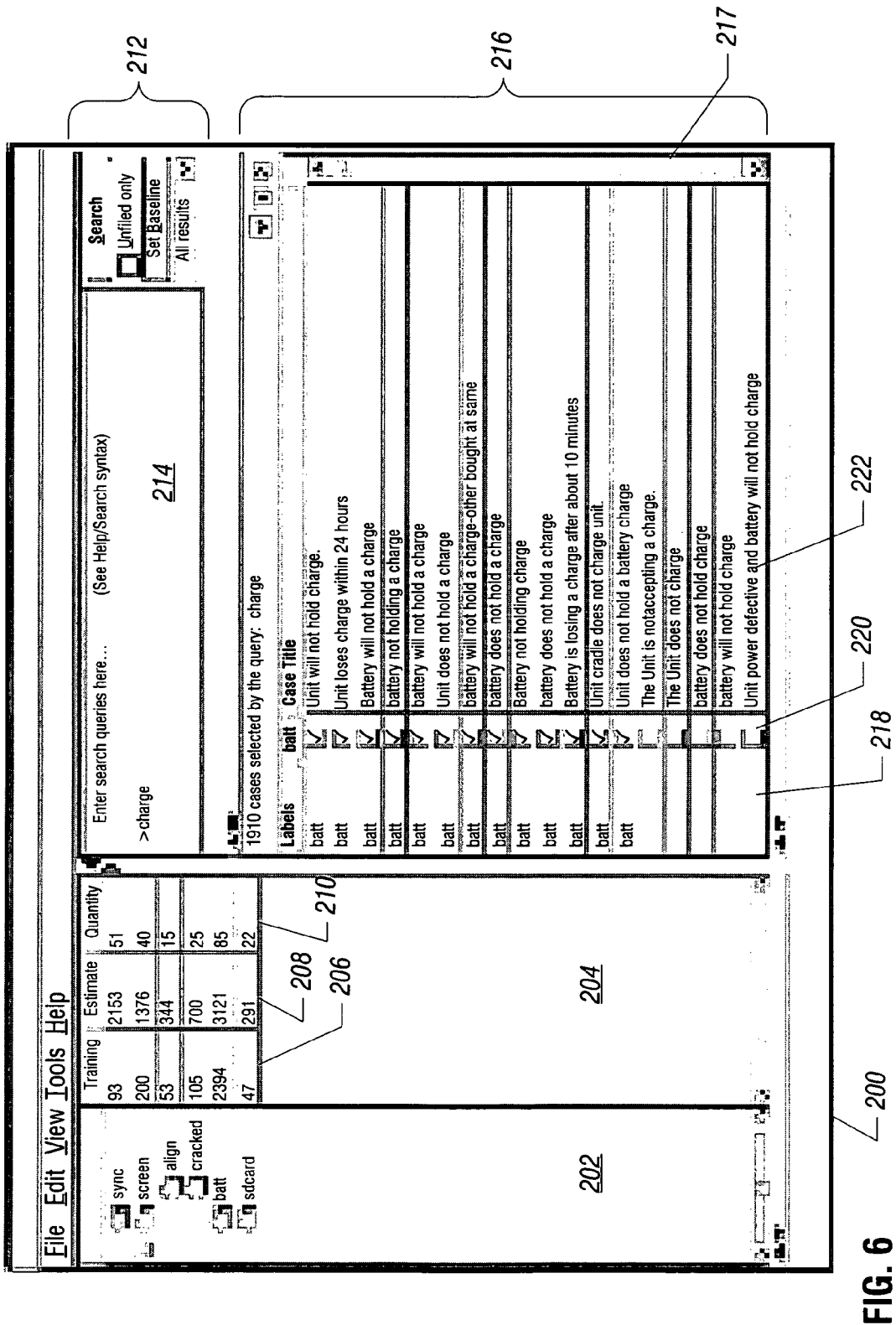
FIG. 6 illustrates a graphical user interface screen presented for performing a search-and-confirm procedure, according to an embodiment.

FIG. 6 illustrates an example of another GUI screen 200 that can be displayed in the user interface 118 (FIG. 3), for performing a search-and-confirm procedure according to some embodiments. The content of the GUI screen 200 is provided by one or more of the search engine 102, confirmation module 122, manager module 101, training module 114, category editor 132, categorizer 116, and quantifier 126.

The GUI screen 200 includes the frame 202 that displays the hierarchy 124 of categories that is processed by the analysis tool 16 of FIG. 2. In the example depicted in FIG. 6, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes the frame 204 that displays a "Training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2,394 cases, and the "sdcard" category has 47 cases.

Another column in the frame 204 is an "Estimate" column 208, which displays the estimated number of cases identified by the quantifier 126 as belonging to each of the categories and subcategories. A third "Quantity" column 210 lists an estimated sum of some data field of the cases in each category, such as time spent on cases that belong in the category or cost of handling the cases in the category. The values in the "Quantity" column 210 are also provided by the quantifier 126. As other examples, the "Quantity" column 210 can indicate costs or percentages of volume of cases.

A search frame 212 is also displayed in the GUI screen 200. The search frame 212 includes a search area 214 in which a user can enter a query for performing the scooping process. As part of the scooping process, the user-provided query is submitted to the search engine 102 (FIG. 2) to retrieve a number of cases that will be displayed in a display frame 216. In the example shown in FIG. 6, the query contains the search term "charge," which means "find cases that contain a word in a case title or elsewhere that contains the word charge."

The display frame 216 displays a summary (e.g., title) of some or each of the cases identified by the search based on the query entered in the search frame 212. Note that each case is associated with several pieces of information, with the title being one of the pieces. In other implementations, other pieces of information associated with the cases can be displayed. In the example of FIG. 6, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a set of randomly selected cases that fit within the display frame 216, such that the scroll bar 217 would not have to be used.

In the third column 222 of the display frame 216, a summary of the case, such as the case title, is illustrated. For example, the summary provided can have been previously entered by a customer support representative when answering customer calls. Even though the displayed summaries may contain misspellings, grammatical errors, and abbreviations, a user looking at each summary can quickly ascertain whether each respective case is associated with the category in question.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category).

In a different embodiment, instead of displaying just one category, the display frame 216 can display multiple categories with fields that are user-selectable to confirm or disconfirm whether a case belongs to the categories. A confirmed case can be added to a positive training set, while a disconfirmed case can be added to a negative training set. The positive and negative training sets are used to train the categorizer.

As a user labels cases as belonging (or not belonging) to particular categories based on input to the confirmation module 122, training cases 112 (positive and/or negative training cases), are added. As the training cases 112 are added, the categorizer 116 is trained concurrently. The training of the categorizer 116 as positive training cases or negative training cases are added can be performed in the background (according to some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Also, as categories are added, modified, and/or deleted, the categories displayed in the frame 202 are changed by the category editor 132 (FIG. 2). During the search, confirm, and training processes, the "Estimate" and "Quantity" columns 208 and 210 in the second frame 204 are also continually updated by the quantifier 126.

FIGS. 7A-7E show flow diagrams of processes that involve a search-and-confirm procedure, training procedure, and a quantifying procedure, according to an embodiment.

Figure 7A:
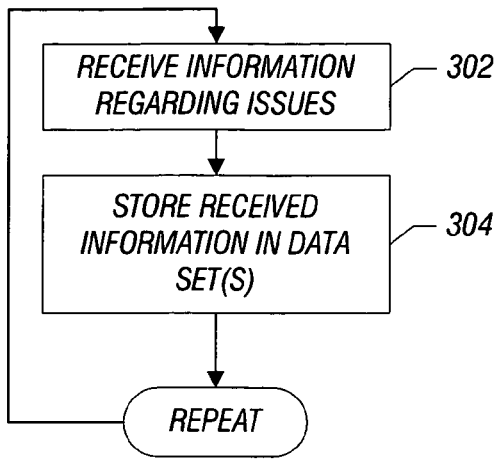
FIGS. 7A-7E are flow diagrams of processes performed by the tool, according to an embodiment.

As shown in FIG. 7A, the data collector 15 (FIG. 1) receives (at 302) information regarding various issues, which information is received from one or plural call agent stations 10 (FIG. 1) or from other data sources. The data collector 15 stores (at 304) information regarding issues in a data set (or plural data sets).

Examples of the types of information that are received and stored include information such as the time and duration of call; information about the product being called about, replacement parts ordered, compensation offered, or repair people sent; information automatically gathered from a computer of a customer; uniform resource locators (URL(s)) or other resources visited and documents consulted in attempting to solve the problem; linked information on the demographics of the customer (e.g., location, age, gender, technological sophistication, loyalty, generated revenue, etc.); call agent-entered description of the state-of-mind of the customer; description of interaction between call agents and customers; call agent selection of a category or problem based on a call; transcripts or recording of on-line chat sessions or telephone conversations; call agent-written short summaries of a problem; customer e-mail messages; records of pages visited on a web site (such as on-line documents viewed by customer or call agent); outputs from a diagnostic program; data stored in a database (e.g., data relating to a prior support call, information relating to a purchase, and demographic information of a customer); computer files received from a customer; survey data; data received by a monitoring device; and others.

Note that the stored information contains information relating to initial or first categorizations performed by call agents (or alternatively by other users or categorizers). From such information relating to the first categorizations, the first distribution is developed that is received by the process depicted in FIG. 2. Steps 302 and 304 are repeated as additional information regarding issues are received.

A search-and-confirm procedure (FIGS. 7B-7C) is performed for the purpose of developing training cases for categories associated with the cases being analyzed. The training cases are used to train one or plural categorizers 116 (FIG. 3).

The analysis tool 16 reads an initial hierarchy of categories (at 310), such as the categories associated with issue paths used by call agents or customers. After one or a few initial categories have been identified (at 319) for the purpose of searching and confirming, the scooping process can begin. To start the scooping process, a user enters a query relating to a category into the search area 214 of the GUI screen 200 (FIG. 6). A query relates to a category if the query contains search term(s) for finding cases that belong to the category. Note that a query relating to one category can also relate to other categories as well; in other words, in some scenarios, a query can contain search terms to find cases belonging to multiple categories. The query, received (at 320) by the search engine 102 (FIG. 3), can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms. A case containing a term that matches any of the collection of terms is considered to be a match by the search engine 102.

In response to the query, the search engine 102 identifies (at 322) the matching set of cases and displays (at 324) the identified set of cases in the user interface 118 (FIG. 3). As depicted in the example GUI screen 200 of FIG. 6, the displayed summary of the matching cases includes numbers, dates, and short strings, with a single line per case, in a table. Alternatively, the identified cases may be displayed in two-dimensional or three-dimensional graphs, or in other formats. A user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 6, some of the user-selectable boxes in column 220 of the display frame 116 can have been checked based on this previous identification or inference.

In an embodiment, the categorizer can determine whether a matching case should be indicated as belonging to a category by computing a confidence indication. The confidence indication is compared to a predefined threshold, and if the confidence indication is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category. Note that check boxes constitute one example implementation for confirming or disconfirming that a case belongs to a category. There are numerous other techniques in other implementations, including techniques to check plural boxes at the same time.

For those cases that have been indicated as belong to the category in question (based on user selection of the box in column 220 in FIG. 6), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. When the user disconfirms a case as belonging to a first category, the user can confirm that the case belongs to another category (although the user does not have to). The positive training set of cases and negative training set of cases are part of the training cases 112 in FIG. 3. Note that there can be plural sets of positive cases and plural sets of negative cases for respective categories.

Steps 319-328 are repeated to develop training cases for other categories or to more fully develop training cases for a current category.

Figure 7C:
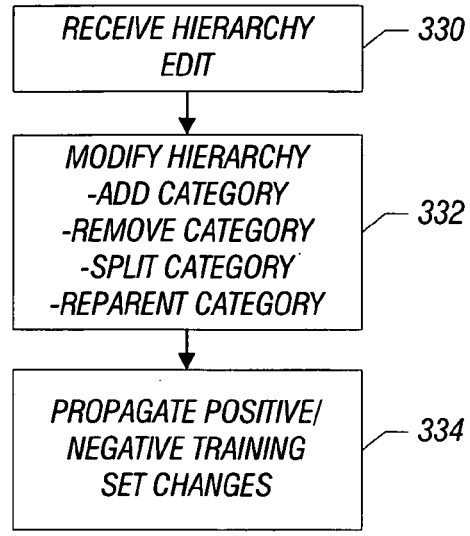
Figure 7B:
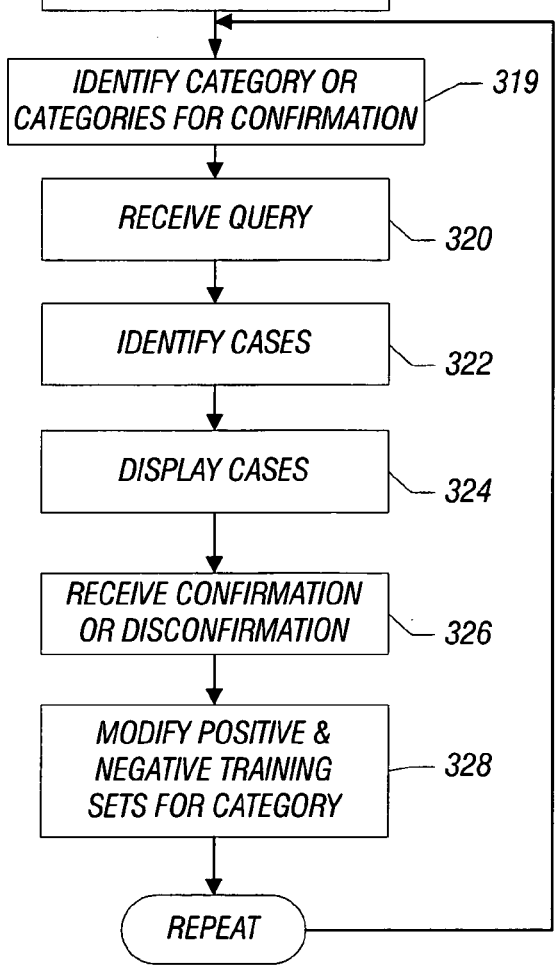

As indicated above, if the first approach of assessing correctness or otherwise identifying discrepancies of a first distribution of cases over a first group of categories is used, then no modification of the categories is desired (since the second group of categories is identical to the first group of categories) so that the tasks of FIG. 7C can be skipped. However, if the second approach of assessing correctness or otherwise identifying discrepancies of a first distribution of cases over a first group of categories is used, then modification of the first group of categories may be desirable since the second group of categories may be different.

To modify the hierarchy of categories (representing the first group of categories), a user can select some control element in the GUI screen 200 of FIG. 6, such as the "File," "Edit," or "Tools" menu item. As shown in FIG. 7C, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 3). In the present discussion, it is noted that adding, deleting, or modifying a category refers to adding, deleting, or modifying a category and/or a subcategory. The user can also split a category (into multiple categories) or reparent a category (indicate one category as being a parent of another category).

The modification of the hierarchy 124 of categories can result in changes of the positive and negative training sets, which changes are propagated (at 334) through the hierarchy.

Figure 7D:
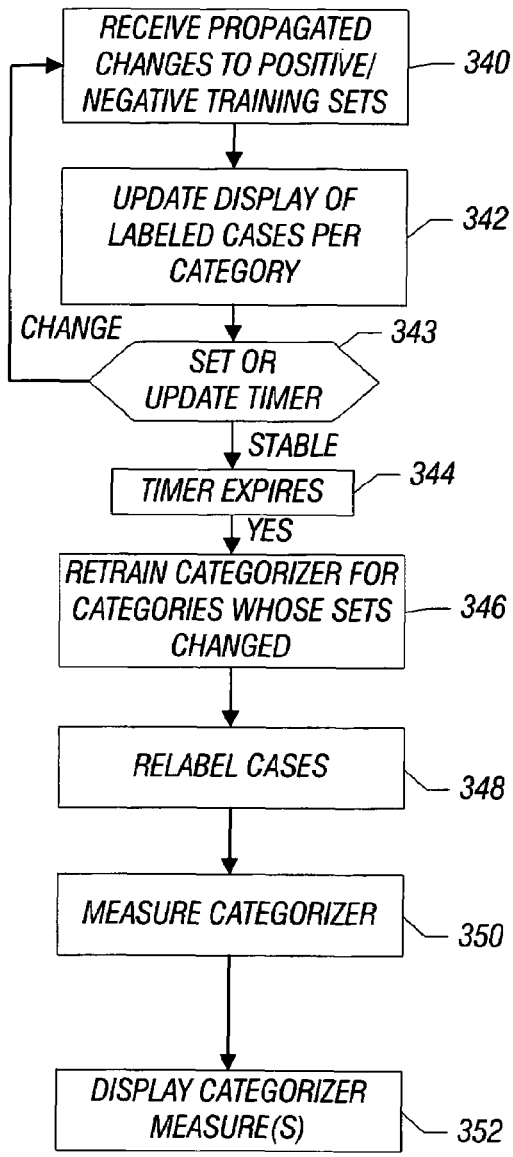

As discussed, as the user performs confirm/disconfirm and as categories or subcategories are added/modified/deleted, changes occur in the positive and negative training sets, which are propagated (at 340) through the hierarchy 124 of categories, as depicted in FIG. 7D. The display of the number of cases per category is updated (at 342) in the column 208 of the frame 204 (FIG. 6).

As the training cases 112 are being updated by the scooping and confirming processes described above, the categorizer 116 is trained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some period of stability. An output provided by the scooping process, confirming process, and training process described above is a categorizer, or plural categorizers.

The retrained categorizer is invoked to re-categorize or relabel (at 348) the cases. Also, the quality of categorization or labeling performed by the categorizer can be determined (at 350) (by measuring the categorizer), and a measure of this quality can be displayed (at 352). The quality measures of a categorizer are listed above. If the quality measures of the categorizations performed by the trained categorizer indicate that the categorizations are either incorrect or of insufficient confidence (quality measure being less than a predefined threshold), the categorizer can be retrained again.

Steps 340-352 are repeated as positive and/or negative training sets are modified for the various categories.

Figure 7E:
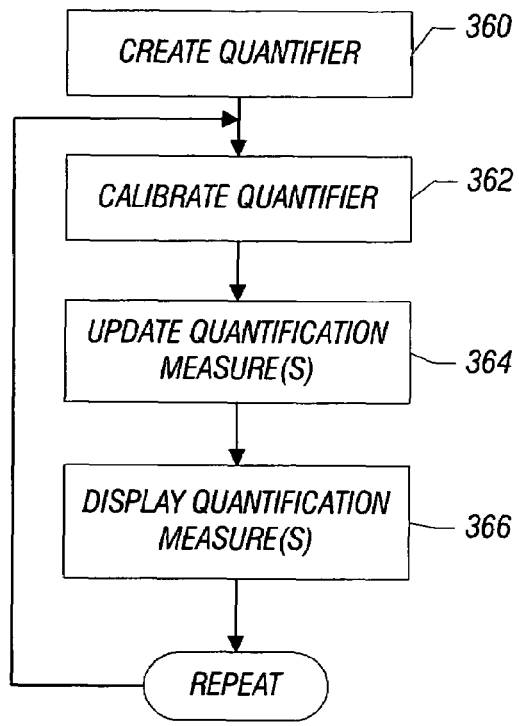

As depicted in FIG. 7E, at some point (which can be during or after the categorizer(s) has been trained and has been invoked to categorize cases in the one or more data sets 22), the quantifier 126 is created (at 360). The quantifier 126 is also calibrated (at 362) to take into account any inaccuracies present in the categorizer 116. As noted above, a categorizer usually does not perform categorization of cases with perfect accuracy. An indication of quality of a categorizer that has been trained is provided by one or more of the quality measures listed above. The quantifier 126 is calibrated based on the quality measures.

In one embodiment, to calibrate the quantifier 126 with respect to a category C, the analysis tool 16 determines the fraction (TPR) of the time that the categorizer is correct when presented with a case that should be categorized in a category C (also referred to as the true positive rate), and the fraction (FPR) of the time that the categorizer is wrong when presented with a case that should not be categorized in the category C (also referred to as the false positive rate). Assuming that a data set includes a total of T cases, of which N cases have been categorized in the category C, then the calibration to be performed by the calibrated quantifier 126 on the value N is as follows:

$$N'=(N-FPR\cdot T)/(TPR-FPR),$$

where N' is the calibrated N value.

Similar fractions representing true positive rates and false positive rates are also maintained for the other categories to enable calibration of the quantity values for other categories. Other techniques for calibrating a quantifier/categorizer are described in U.S. Ser. No. 11/080,098, entitled "A Method of, and System for, Classification Count Adjustment," filed by George H. Forman et al., on Mar. 14, 2005. In other embodiments, any other technique of calibrating a quantifier or adjusting its output quantification, especially by observing the behavior of its underlying categorizer(s), may also be used.

In yet another calibration technique, a score associated with each of a group of cases is obtained from the categorizer. A statistical distribution is computed based on the scores. The quantification measure is adjusted based on the statistical distribution.

The calibrated quantifier 126 is used to update (at 364) quantification measure(s) for each of the categories. The calibrated quantifier 126 produces calibrated quantification measure(s). The categorizer(s) 116 associated with the quantifier 126 provides information regarding the categorized cases to the quantifier 126 to enable the quantifier 126 to produce the quantification measure(s). Note that the quantification process can proceed concurrently with the search-and-confirm and the training processes discussed above. Thus, the analysis tool 16 may present running estimate(s) of the quantification measure(s) in each category. The quantifier 126 displays (at 366) the updated quantification measures, such as estimated number of cases and quantity estimates (columns 208 and 210 in the frame 204 of FIG. 3).

Steps 362-366 are repeated to continually update quantification measure(s) as more cases are received and the categorizer 116 is retrained.

Instructions of the various software modules described above are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving a first distribution of cases over a first group of categories;
   classifying, with a categorizer trained using a search-and-confirm technique, the cases into a second group of categories;
   generating a second distribution of the cases over the second group of categories using results of the classifying; and
   comparing the first and second distributions to identify differences between the first and second distributions.

2. The method of claim 1, wherein classifying the cases into the second group of categories comprises classifying the cases into the second group of categories that are identical to the first group of categories.

3. The method of claim 1, wherein comparing the first and second distributions comprises using one of a confusion matrices technique, a chi-squared technique, a cross-entropy technique, a mutual information technique, an information gain technique, and a mutual scatter analysis technique.

4. The method of claim 1, further comprising, in response to the identified differences, performing at least one of: identifying a remedial action to address the identified differences; providing a report of the differences; identifying a category in the first group for which the first distribution over-estimated or under-estimated a number of cases; and identifying one or more example cases assigned to a first group category in the first distribution, which one or more example cases are not assigned to a corresponding second group category in the second distribution.

5. The method of claim 4, wherein identifying the remedial action comprises at least one of: modifying the first group of categories, training users with respect to the first group of categories, developing documentation to assist users in assigning cases to the first group of categories, changing incentives given to users, correcting a measure estimated for a category in the first group, changing a workflow, and updating a report.

6. The method of claim 1, wherein the first and second groups of categories are different, the method further comprising providing a report of one or more categories in one of the first and second groups that are not part of the other of the first and second groups of categories.

7. The method of claim 1, wherein at least one of the first and second groups of categories comprises a hierarchy of categories.

8. The method of claim 7, further comprising providing a report of sub-categories in the second group not included in the first group.

9. The method of claim 1, wherein receiving the first distribution comprises receiving the first distribution based on initial categorizations performed by one of a human and another categorizer.

10. The method of claim 1, further comprising assessing correctness of the first distribution based on the identified differences.

11. A method comprising:
receiving a first distribution of cases over a first group of issue paths based on initial assignments;
training a categorizer, wherein the training comprises submitting one or more queries to identify matching cases and receiving indications of whether the identified matching cases belong or do not belong to at least one category in a group of categories;
classifying the cases of the first distribution into the group of categories using the trained categorizer;
generating a second distribution of the cases over the group of categories using results of the classifying;
comparing the first and second distributions; and
effecting an action to improve assignments of cases into a second group of issue paths.

12. The method of claim 11, wherein effecting action to improve assignments of cases to the second group of issue paths is with respect to the second group of issue paths that is identical to the first group of issue paths.

13. The method of claim 11, wherein effecting action to improve assignments of cases to the second group of issue paths is with respect to the second group of issue paths that is different from the first group of issue paths, wherein the second group of issue paths comprises the group of categories.

14. The method of claim 13, wherein the group of categories is initially based on the first group of issue paths, the method further comprising modifying the group of categories, wherein the second group of issue paths comprises the group of categories that has been modified.

15. An article comprising at least one storage medium containing instructions that when executed cause a system to:
receive a first distribution of cases over a first group of categories;
classify, with a categorizer trained using a search-and-confirm technique, the cases into a second group of categories;
generate a second distribution of the cases over the second group of categories using results of the classifying; and
compare the first and second distributions to identify differences between the first and second distributions.

16. The article of claim 15, wherein the instructions when executed cause the system to further assess correctness of the first distribution based on the identified differences.

17. The article of claim 15, wherein comparing the first and second distributions comprises using one of a confusion matrices technique, a chi-squared technique, a cross-entropy technique, a mutual information technique, an information gain technique, and a mutual scatter analysis technique.

18. The article of claim 15, wherein the instructions when executed cause the system to further identify a remedial action to address the identified differences.

19. The article of claim 18, wherein identifying the remedial action comprises at least one of: modifying the first group of categories, training users with respect to the first group of categories, developing documentation to assist users in assigning cases to the first group of categories, changing incentives given to users, correcting a measure estimated for a category in the first group, changing a workflow, and updating a report.

20. The article of claim 15, wherein receiving the first distribution comprises receiving the first distribution based on initial categorizations performed by one of a human and another categorizer.

\* \* \* \* \*